July 26, 1960           R. K. BRAMLEY           2,946,159
LAWN MOWER SERVICE DEVICE
Filed June 25, 1957           2 Sheets-Sheet 1
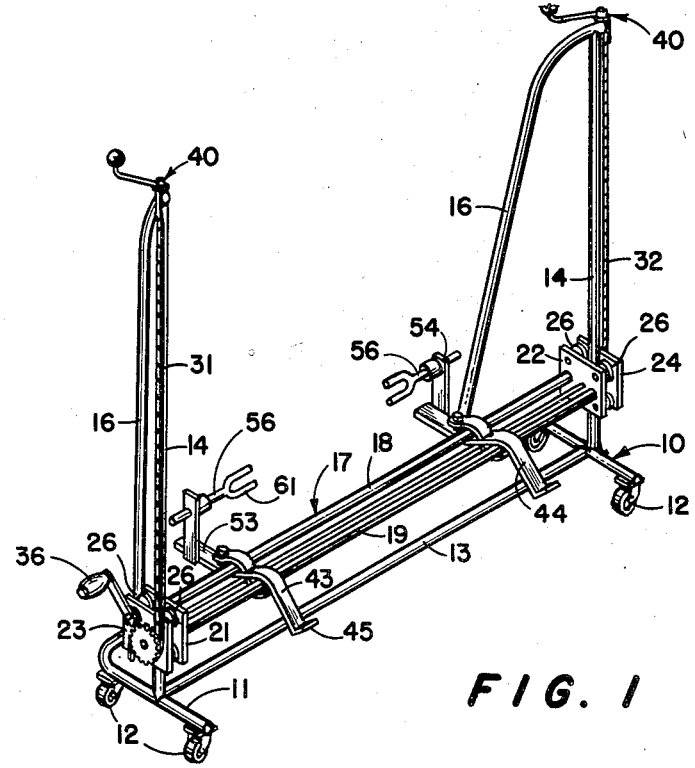
FIG. 1
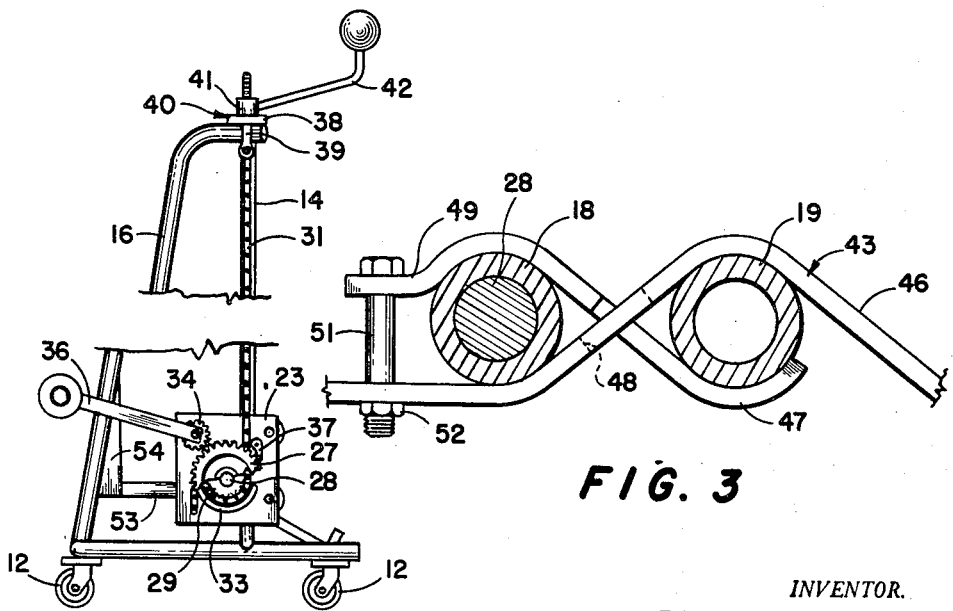
FIG. 2
FIG. 3
INVENTOR.
ROBERT K. BRAMLEY
BY
ATTORNEY July 26, 1960     R. K. BRAMLEY     2,946,159
LAWN MOWER SERVICE DEVICE Filed June 25, 1957     2 Sheets-Sheet 2

INVENTOR.
ROBERT K. BRAMLEY
BY

ATTORNEY

United States Patent Office 2,946,159
Patented July 26, 1960

2,946,159

LAWN MOWER SERVICE DEVICE

Robert K. Bramley, 16722 Grovewood, Cleveland, Ohio

Filed June 25, 1957, Ser. No. 667,765

3 Claims. (Cl. 51—48)

This invention relates to lift mechanisms in general and more particularly to a lift for lawn mowers and the like.

It is an important object of this invention to provide a lift device to raise power lawn mowers and the like to a suitable height for repair work.

It is another object of this invention to provide a lift device for power lawn mowers which leaves the various critical portions of the lawn mower easily accessible for repair.

It is still another object of this invention to provide a lifting device for power lawn mowers in combination with a lawn mower grinder particularly suited for the servicing and sharpening of such lawn mowers.

Further objects and advantages will appear from the following description and drawings, wherein:

Figure 1 is a perspective view of a preferred lawn mower lift according to this invention;

Figure 2 is a side elevation showing the lifting mechanism;

Figure 3 is an enlarged fragmentary view showing the adjustable mounting of the mower support;

Figure 4:
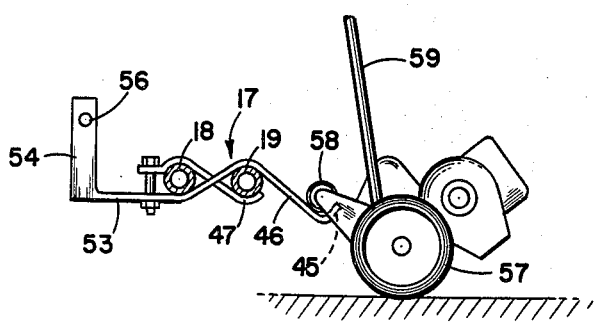
Figure 4 is a side elevation with parts removed for purposes of clarity illustrating the first step in positioning a lawn mower on the lift mechanism according to this invention.

The lift is provided with a frame 10 preferably formed of tubular members welded together. The frame includes a U-shaped base 11 on which is mounted casters 12 so that the frame can be rolled to any desired location, a tie bar 13 extending between the arms of the base 11 to increase the strength thereof and vertical guides 14 on the sides of the base 11 supported at their upper ends by inclined braces 16. A carriage assembly 17 is vertically movable on the vertical guides 14 and includes two horizontal tubes 18 and 19 on the ends of which are mounted inner plates 21 and 22. The inner plates 21 and 22 are positioned adjacent to the inner side of the associated vertical guides 14 and cooperate with outer plates 23 and 24 respectively, to provide a mounting for guide rollers 26 which engage the opposite sides of the vertical guides 14.

In order to raise and lower the carriage 17, I provide a winch mechanism, best illustrated in Figure 2. Mounted on one end of the carriage is a driven gear 27 keyed to a rod 28 which extends through the tube 18. A pair of chain sprockets 29 are keyed to the rod 28 with one on each end and are arranged to engage chains 31 and 32, the upper ends of which are mounted on the upper end of the associated braces 16. Those skilled in the art will recognize that rotation of the chain sprockets 29 in the clockwise direction (as viewed in Figure 2) will cause the sprockets to climb up along the chains 31 and 32 and raise the carriage 17 up along the vertical guides 14. To insure that the chains are maintained in proper engagement with their associated chain sprockets 29, I provide a semi-circular guide 33 on each of the outer plates 23 and 24 which hold the associated chain in engagement with the sprockets. The sprocket and guide structure of the far end does not appear in Figure 1 but it should be understood that it is similar to the structure at the near end.

To rotate the driven gear 27, I provide a pinion 34 on which a handle 36 is mounted. As viewed in Figure 2, rotation of the handle 36 in counterclockwise direction produces clockwise rotation of the driven gear 27 and the chain sprockets 29. Such clockwise rotation will lift the two ends of the carriage 17 uniformly up along the vertical guides 14. A latch 37 is adapted to engage the driven gear 27 and prevent the carriage from backing down from the raised position. When it is desired to lower the carriage 17, it is merely necessary to rotate the latch 37 in a counterclockwise direction out of engagement with the gear 27 and rotate the handle 36 in a clockwise direction.

To provide leveling of the carriage 17, I utilize an adjustable leveling mechanism 40 to which the upper ends of the chains 31 and 32 are attached. A similar adjusting mechanism, best shown in Figure 2, is provided for each of the chains 31 and 32 so only one will be described in detail. The leveling mechanism 40 includes a plate 38 mounted on the upper end of the brace 16 through which extends a threaded bolt 39. The upper ends of the chain 31 are secured to the lower end of the bolt 39 and a nut 41 is threaded onto the upper end on the upper side of the plate 38. I provide a crank 42 which is used to rotate the nut 41 and raise or lower the threaded bolt 39 and in turn the chain 31. Since the cranks 42 can be operated independently, it is possible to produce leveling and fine vertical adjustment of the carriage.

There are two similar mower supports 43 and 44 mounted on the tubes 18 and 19 on which the mower itself is mounted. Since the mower supports 43 and 44 are similar, only one will be described in detail with the understanding that the description applies to the other as well. The support 43 includes a bar 46 formed with a right angle bend 45 at its forward end which forms a roll receiving notch. The bar 46 extends over the tube 19 and under the tube 18, as best shown in Figure 3. To clamp the bar 46 on the tubes 18 and 19, I provide a second bar 47 which extends through a central slot 48 in the bar 46. The bar 47 extends over the tube 18 and under the tube 19 and is formed with a rearward projection portion 49 through which a bolt 51 extends. A nut 52 is threaded onto the lower end of the bolt 51 and engages the lower side of the bar 46 so by tightening the nut 52, the two bars 46 and 47 are brought into tight engagement with the tubes 18 and 19 to lock the bar 46 to the tubes. By simply loosening the nut 52, the support 43 is loosened so that it can be moved along the tubes to any desired location. The rearward end of the bar 46 is formed with a projection 53 on which is mounted a vertical member 54 which carries a horizontally movable forked handle lock 56.

Figure 5:
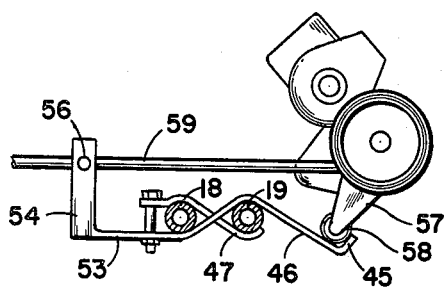
Figure 5 is a view similar to Figure 4 showing the lawn mower in the mounted position; and, Figure 6 is a view similar to Figure 5 showing a grinder in position for sharpening the lawn mower.
Figure 6:
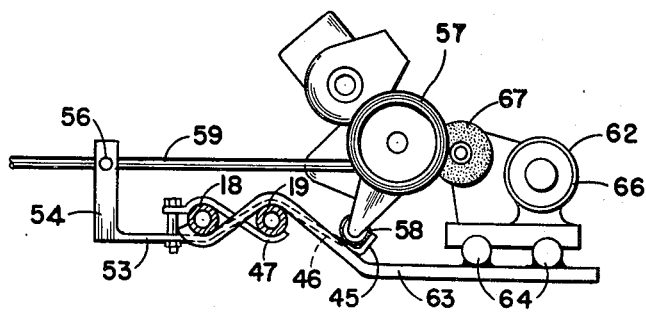

Referring now to Figures 4 through 6, a lawn mower 57 is mounted on the lift by first lowering the carriage 17 until it is adjacent to the floor. The lawn mower 57 is then tipped forward and the mower roll 58 is placed in the notches formed by the right angle bends 45 of the two mower supports 43 and 44. The mower handle 59 is then pulled down until it is between the locks 56. The locks are formed with a forked inner end 61, shown in Figure 1, which secure the handle against vertical movement in either direction. When the handle is properly positioned between the forked ends 61, it is merely necessary to slide the locks 56 inwardly until the handle 59 is positioned within the fork 61 at which time the elements are in position shown in Figure 5 and the mower 57 is completely supported by the lift. The handle 36 is then rotated in a counterclockwise direction to raise the carriage 17 and mower to any desired height. Because the mower is supported by the roller 58 and handle 59, even the under portions of the mower are accessible for repair or sharpening as the case may be.

If the mower is to be sharpened, it is merely necessary to mount a grinder on the lift. The preferred grinder 62 is mounted on the lift by means of a pair of bars 63 which extend over the tube 19 and hook under the tube 18. A pair of rods 64 are fastened to the bars 63 and act as guide rails along which the grinder 62 can be moved parallel to the mower. The grinder will normally include an electric motor 66 which drives a grinder wheel 67 and a blade engaging guide (not shown) which engages the blade of the mower to properly position it as the grinder is moved across the blade. The grinder itself forms no part of this invention except insofar as it cooperates with the lift and any suitable type of lawn mower grinders may be used in conjunction with the lift.

Those skilled in the art will recognize that the simple structure disclosed can be used in the handling of even heavy lawn mowers and that the servicing of such mowers is substantially simplified by the elimination of the manual lifting of the mower and by the improved accessibility of the mower parts for repair. With such a lift there is no need to do the repair work with the mower on the floor and heavy lifting is eliminated.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of the operation. Accordingly, the appended claims and not the aforesaid detailed description are determinative of the scope of the invention.

I claim:

1. A service device for a lawn mower which includes a rearward roller, a handle and a cutter blade comprising a base having vertical side rails, a carriage formed with guide means engaging said rails, winch means connected between said base and carriage operable to move said carriage vertically along said rails, a pair of spaced mower supports on said carriage each formed with a notch adapted to receive said roller and lock means engageable with said handle when said mower is supported by said support with its roller in said notches, said lock means preventing rotation of said mower about said roller, and a grinder on said carriage adapted to grind the blade of a mower supported by said carriage.

2. A lawn mower lift for mowers having a rearward roller, a handle and cutter blade comprising a U-shaped base having spaced arms, a vertical rail on each arm, a carriage extending between said rails, guide means on said carriage engaging said rails whereby said carriage is vertically movable along said rails, a chain adjacent to each rail supported at their upper ends by said base, a rod journaled on said carriage, a sprocket fixed to each end of said rod engaging the associated chain, means rotating said rod and sprocket whereby said carriage moves vertically along said chains and rails, a pair of spaced mower supports on said carriage each formed with a notch adjacent to the forwardmost portion of said carriage adapted to receive said roller, means on said carriage rearwardly of said notches adapted to engage said handle when said roller is in said notch and prevent rotation of said mower about said roller.

3. A lawn mower service device for mowers having a rearward roller, a handle and cutter blade comprising a U-shaped base having spaced arms, a vertical rail on each arm, a carriage extending between said rails, guide means on said carriage engaging said rails whereby said carriage is vertically movable along said rails, a chain adjacent to each rail supported at their upper ends by adjusting means independently operable to move each chain in a vertical direction, a rod journalled on said carriage, a sprocket fixed to each end of said rod engaging the associated chain, means rotating said rod and sprocket whereby said carriage moves vertically along said chains and rails, a pair of spaced mower supports on said carriage each formed with a notch adjacent to the forwardmost portion of said carriage adapted to receive said roller, means on said carriage rearwardly of said notches adapted to engage said handle when said roller is in said notch and prevent rotation of said mower about said roller, and grinding means on said carriage adapted to grind the blade of the mower while it is supported on said carriage.

References Cited in the file of this patent

UNITED STATES PATENTS

| | | |
|---|---|---|
| 1,484,708 | Grassman | Feb. 26, 1924 |
| 2,149,774 | Ingleman | Mar. 7, 1939 |
| 2,479,099 | Cerny | Aug. 16, 1949 |
| 2,657,502 | Bruffey | Nov. 3, 1953 |
| 2,716,845 | Viall et al. | Sept. 6, 1955 |